United States Patent
Kimura et al.

(10) Patent No.: US 9,564,782 B2
(45) Date of Patent: Feb. 7, 2017

(54) WINDING, WINDING METHOD, AND AUTOMOTIVE ROTATING ELECTRIC MACHINE

(75) Inventors: Takahiro Kimura, Chiyoda-ku (JP); Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 512 days.

(21) Appl. No.: 14/116,927

(22) PCT Filed: Sep. 1, 2011

(86) PCT No.: PCT/JP2011/069903
§ 371 (c)(1),
(2), (4) Date: Nov. 11, 2013

(87) PCT Pub. No.: WO2013/031004
PCT Pub. Date: Mar. 7, 2013

(65) Prior Publication Data
US 2014/0091657 A1    Apr. 3, 2014

(51) Int. Cl.
*H02K 11/00* (2016.01)
*H02K 21/12* (2006.01)
(Continued)

(52) U.S. Cl.
CPC ...... *H02K 3/28* (2013.01); *H02K 3/12* (2013.01); *H02K 3/18* (2013.01); *H02K 3/522* (2013.01); *H02K 3/528* (2013.01)

(58) Field of Classification Search
CPC .................................... H02K 3/46; H02K 3/52
(Continued)

(56) References Cited

U.S. PATENT DOCUMENTS 4,988,055 A * 1/1991 Sakai .................. H01F 5/02
242/159
5,208,571 A * 5/1993 Muller .................. H01F 7/20
335/299
(Continued)

FOREIGN PATENT DOCUMENTS

CN 1628405 A 6/2005
JP 56-128386 9/1981
(Continued)

OTHER PUBLICATIONS

Communication dated Jul. 15, 2015 from the State Intellectual Property Office of the P.R.C. in counterpart application No. 201180071514.0.

(Continued)

*Primary Examiner* — Jose Gonzalez Quinones
(74) *Attorney, Agent, or Firm* — Sughrue Mion, PLLC; Richard C. Turner (57) ABSTRACT

[Problem] A winding is provided which is so arranged that disengagement of a winding conductor is not caused after a winding around being finished.
[Constitution] A winding according to the present invention includes a first descending conductor portion (2818c) being bent from an end-portion (2818a) of a winding conductor placed at a top portion of an elevated winding portion (28m) toward an outer lateral side in an axial direction of a winding (15), and descending along a side face of the elevated winding portion (28m), from the top portion thereof to a predetermined winding layer (2816) among a plurality of winding layers constituting the elevated winding portion (28m); a first connection conductor portion (2816a) bent from the first descending conductor portion (2818c) toward an inner lateral side in the axial direction of the winding (15), and disposed along the side face of the elevated winding portion (28m) in a direction to which a winding (Continued)

conductor constituting the winding (15) extends; and a second descending conductor portion (2816c) being bent from the first connection conductor portion (2816a) toward the outer lateral side in the axial direction of the winding (15), and descending along the side face of the elevated winding portion (28m), from the predetermined winding layer (2816) to another predetermined winding layer (2814).

18 Claims, 3 Drawing Sheets

(51) Int. Cl.
*H02K 3/28* (2006.01)
*H02K 3/12* (2006.01)
*H02K 3/18* (2006.01)
*H02K 3/52* (2006.01)

(58) Field of Classification Search
USPC ....... 310/71, 156.66, 156.69, 156.71, 156.73
See application file for complete search history.

(56) References Cited

U.S. PATENT DOCUMENTS

| 7,202,639 B2 | 4/2007 | Lawahmeh |
| 2005/0218744 A1* | 10/2005 | Nakanishi ............... H02K 3/18 310/194 |

FOREIGN PATENT DOCUMENTS

| JP | 6-14487 A | 1/1994 |
| JP | 11-130347 A | 5/1999 |
| JP | 2005-33919 A | 2/2005 |
| WO | 2004/038893 A1 | 5/2004 |

OTHER PUBLICATIONS

Communication dated Aug. 26, 2014, issued by the Japanese Office Action in counterpart Application No. 2013530980.
Machine Translation of JP11130347A.
Machine Translation of JP2005033919A.
Machine Translation of WO2004038893A1.

\* cited by examiner

WINDING, WINDING METHOD, AND AUTOMOTIVE ROTATING ELECTRIC MACHINE

CROSS REFERENCE TO RELATED APPLICATIONS

This application is a National Stage of International Application No. PCT/JP2011/069903 filed Sep. 1, 2011, the contents of all of which are incorporated herein by reference in their entirety.

TECHNICAL FIELD

The present invention relates to a winding of ring-shaped structure, a method of winding the winding, and an automotive rotating electric machine including the winding.

BACKGROUND ART

For example, an automotive alternating-current generator mounted on a motor vehicle as an automotive rotating electric machine includes an armature winding mounted on a stator as a stator winding (hereinafter referred to as an armature winding), and a field winding mounted on a rotor as a rotor winding (hereinafter referred to as a field winding). The field winding generates magnetic field flux when a DC current is supplied to the winding by way of a pair of brushes and a pair of slip rings, and induces an AC voltage in the armature winding by the rotation in an inner space of the stator. The field winding is disposed, for example, in a space where a pair of rotor magnetic poles (claw pole), each including a plurality of claws, is opposing to each other, and an outer circumferential face of the field winding is surrounded by the plurality of claws of the pair of rotor magnetic poles.

In such an automotive alternating-current generator, there exists a conventional automotive alternating-current generator in which, by effectively utilizing a space where the pair of rotor magnetic poles described above is opposing to each other, a winding conductor of field winding is wound up toward undersides of claws of the pair of rotor magnetic poles, and the alternating-current generator is so arranged to achieve output-power enhancement by increasing the number of turns of the field winding (for example, refer to Patent Document 1). In the field winding of the conventional automotive alternating-current generator, a central portion of an outer circumferential portion of the field winding is raised to the shape of mound; such a winding scheme is, usually, referred to an elevated winding scheme.

A conventional automotive alternating-current generator disclosed in Patent Document 1 effectively utilizes a space where a pair of rotor magnetic poles is opposing to each other, and adopts an elevated winding structure to a field winding, so that the number of turns of the field winding can be increased as described above, and output-power enhancement of the automotive alternating-current generator is made possible.

RELATED ART DOCUMENT

Patent Document

[Patent Document 1] U.S. Pat. No. 7,202,639 B2

DISCLOSURE OF THE INVENTION

Problems to be Solved by the Invention

In the case of field winding in the elevated winding scheme described above, an end-portion of a winding conductor constituting the field winding is placed at a top portion of an elevated winding portion. Therefore, after ceasing a winding around, it is necessary to guide the end-portion of a winding conductor placed at a top portion of the elevated winding portion toward an end-portion in an axial direction of the field winding, by causing it descending from the top portion, to make the winding conductor itself as an external terminal connection conductor of the field winding, or to connect to an external conductor connection terminal of the field winding provided in advance. However, when the number of overlaps of the elevated winding portion is increased, the height of the top portion of the elevated winding portion becomes larger, so that there arises a necessity of steeply descending the end-portion of the winding conductor placed at the top portion of the elevated winding.

Nevertheless, when the winding conductor is caused to steeply descend from a top portion of the elevated winding portion, the descending winding conductor is not sufficiently adhered to another surface of winding conductor, so that there arises a case in that a winding conductor from the top portion of the elevated winding portion to the external terminal connection terminal of the field winding does not come along with an outer circumferential face of the field winding, causing winding disintegration and disengagement of part of the winding conductor thus easily after the winding around being finished. A winding conductor separated from the field winding in which disengagement and winding disintegration are caused in part of the winding conductor of the field winding has a possibility to make contact with a rotor magnetic pole(s) when the field winding is assembled onto a rotor, so that the field winding becomes under a short-circuiting state during the operation of the automotive alternating-current generator, resulting in not inducing the voltage in the armature winding, which may give rise to cause a failure due to non-generation of the automotive alternating-current generator.

According to the above, in the field winding in a conventional automotive alternating-current generator, there arises problems in that when the height of an elevated winding portion of the field winding is made larger for the sake of enhanced generator output, portions where the winding conductor does not come along in an outer circumferential portion of the field winding do grow, so that the number of overlaps of the elevated winding portion cannot be increased to a larger extent.

The present invention has been directed at solving these problems in a field winding in the conventional automotive alternating-current generator described above, and an object of the invention is to provide a winding, a winding method, and an automotive rotating electric machine that mounts the winding thereon as a field winding which are so arranged that disengagement of the winding conductor is not caused after the winding around being finished.

Means for Solving the Problems

A winding according to the present invention is a ring-shaped winding including, in an outer circumferential portion thereof, an elevated winding portion in which a cross-sectional shape thereof takes a shape of mound in an axial direction, wherein the winding comprises a first descending conductor portion being bent from an end-portion of a winding conductor placed at a top portion of the elevated winding portion toward an outer lateral side in the axial direction of the winding, and descending along a side face of the elevated winding portion, from the top portion thereof to a predetermined winding layer among a plurality of winding layers forming the elevated winding portion;

a first connection conductor portion bent from the first descending conductor portion toward an inner lateral side in the axial direction of the winding, and disposed along the side face of the elevated winding portion in a direction to which a winding conductor constituting the winding extends; and a second descending conductor portion being bent from the first connection conductor portion toward the outer lateral side in the axial direction of the winding, and descending along the side face of the elevated winding portion, from the predetermined winding layer to another predetermined winding layer.

In addition, a winding method according to the present invention is the method of winding a ring-shaped winding including, in an outer circumferential portion thereof, an elevated winding portion in which a cross-sectional shape thereof takes a shape of mound in an axial direction, and the method is characterized in that an end-portion of a winding conductor in a top portion of the elevated winding portion descends along a side face of the elevated winding portion, by way of at least two descending conductor portions bent toward an outer lateral side in the axial direction of the winding.

Moreover, an automotive rotating electric machine according to the present invention includes an automotive alternating-current generator driven by an internal-combustion engine mounted on a motor vehicle, and the machine is characterized in that a ring-shaped winding including, in an outer circumferential portion thereof, an elevated winding portion in which a cross-sectional shape thereof takes a shape of mound in an axial direction is mounted on a rotor as a field winding thereof, and the field winding comprises a first descending conductor portion being bent from an end-portion of a winding conductor placed at a top portion of the elevated winding portion toward an outer lateral side in the axial direction of the winding, and descending along a side face of the elevated winding portion, from the top portion thereof to a predetermined winding layer among a plurality of winding layers forming the elevated winding portion;

a first connection conductor portion bent from the first descending conductor portion toward an inner lateral side in the axial direction of the winding, and disposed along the side face of the elevated winding portion in a direction to which a winding conductor constituting the winding extends; and a second descending conductor portion being bent from the first connection conductor portion toward the outer lateral side in the axial direction of the winding, and descending along the side face of the elevated winding portion, from the predetermined winding layer to another predetermined winding layer.

Effects of the Invention

According to a winding in the present invention, the winding comprises a first descending conductor portion being bent from an end-portion of a winding conductor placed at a top portion of an elevated winding portion toward an outer lateral side in the axial direction of the winding, and descending along a side face of the elevated winding portion, from the top portion thereof to a predetermined winding layer among a plurality of winding layers forming the elevated winding portion; a first connection conductor portion bent from the first descending conductor portion toward an inner lateral side in the axial direction of the winding, and disposed along the side face of the elevated winding portion in a direction to which a winding conductor constituting the winding extends; and a second descending conductor portion being bent from the first connection conductor portion toward the outer lateral side in the axial direction of the winding, and descending along the side face of the elevated winding portion, from the predetermined winding layer to another predetermined winding layer, so that disengagement of the winding conductor is not caused after the winding around being finished even when the height of the elevated winding portion is made larger, enabling to increase the number of turns of the winding by making the height of its elevated winding portion larger.

In addition, according to a winding method in the present invention, an end-portion of a winding conductor in a top portion of the elevated winding portion is made in such a way to descend along a side face of the elevated winding portion, by way of at least two descending conductor portions bent toward an outer lateral side in the axial direction of the winding, so that a winding can be obtained in which disengagement of the winding conductor is not caused after the winding around being finished even when the height of the elevated winding portion is made larger.

Moreover, according to an automotive rotating electric machine in the present invention, a ring-shaped winding including, in an outer circumferential portion thereof, an elevated winding portion in which a cross-sectional shape thereof takes a shape of mound in an axial direction is mounted as a field winding mounted on a rotor, and the field winding comprises a first descending conductor portion being bent from an end-portion of a winding conductor placed at a top portion of the elevated winding portion toward an outer lateral side in the axial direction of the winding, and descending along a side face of the elevated winding portion, from the top portion thereof to a predetermined winding layer among a plurality of winding layers forming the elevated winding portion; a first connection conductor portion bent from the first descending conductor portion toward an inner lateral side in the axial direction of the winding, and disposed along the side face of the elevated winding portion in a direction to which a winding conductor constituting the winding extends; and a second descending conductor portion being bent from the first connection conductor portion toward the outer lateral side in the axial direction of the winding, and descending along the side face of the elevated winding portion, from the predetermined winding layer to another predetermined winding layer, so that output-power enhancement of the automotive rotating electric machine is achieved by effectively utilizing a space where rotor magnetic poles are opposing to each other, and by increasing the number of turns of the field winding; and moreover, it is possible to obtain an automotive rotating electric machine in which disengagement of the winding conductor is not caused after the winding around being finished, and reliability enhancement can be realized during the assembly of the automotive rotating electric machine, without causing a failure such as short circuiting.

EMBODIMENTS FOR CARRYING OUT THE INVENTION

Figure 1:
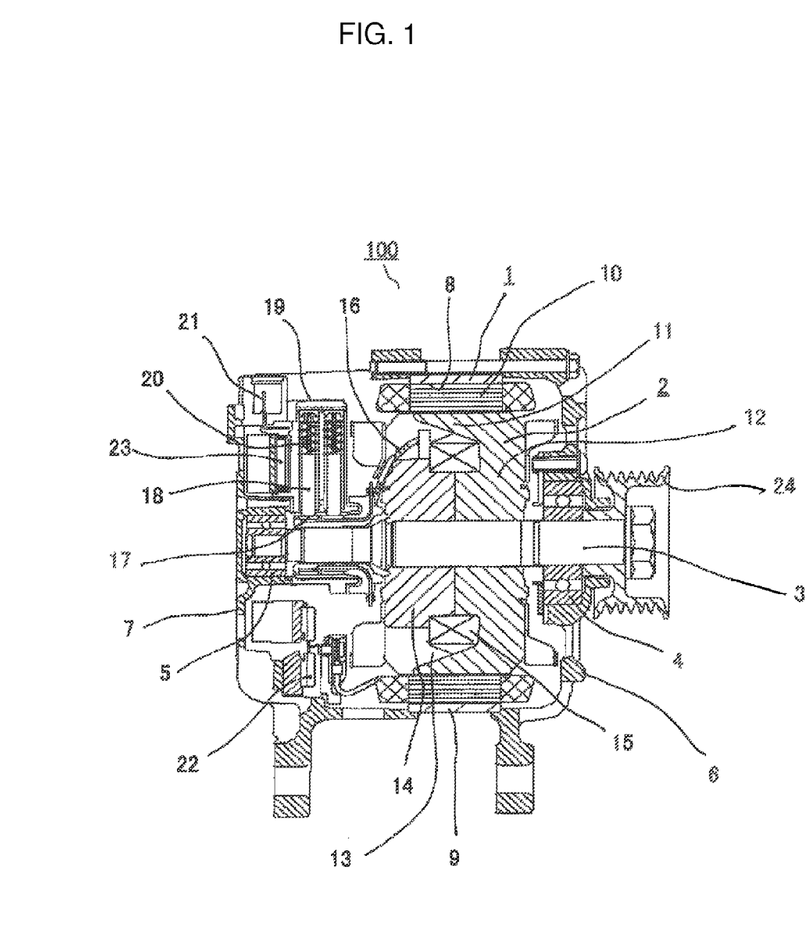
FIG. 1 is a cross-sectional diagram illustrating an example of an automotive alternating-current generator.

FIG. 1 is a cross-sectional diagram illustrating an example of an automotive alternating-current generator as an automotive rotating electric machine. In FIG. 1, an automotive alternating-current generator 100 includes a stator 1, a rotor 2 that is inserted within an internal space of the stator 1 and rotates, a rotor shaft 3 that supports the stator 1 and the rotor 2, and brackets 6 and 7 that support the rotor shaft 3 rotationally movable with one another by means of bearings 4 and 5.

The stator 1 has an annular stator core 9 including a plurality of stator slots 8 along an inner circumferential face thereof, and an armature winding 10 housed in the stator slots 8 as a stator winding. The rotor 2 has an iron-made first rotor magnetic pole 12 including a plurality of claws 11 extending in an axial direction of the rotor 2, an iron-made second rotor magnetic pole 14 including a plurality of claws 13 extending in the axial direction of the rotor 2, and a field winding 15. The first rotor magnetic pole 12 and the second rotor magnetic pole 14 constitute the rotor magnetic poles.

The first rotor magnetic pole 12 and the second rotor magnetic pole 14 abut to each other, and are fixed on a circumferential face of the rotor shaft 3. The plurality of claws 11 of the first rotor magnetic pole 12 is rowed circumferentially interposing space portions, and similarly the plurality of claws 13 of the second rotor magnetic pole 14 is rowed circumferentially interposing space portions. The plurality of claws 11 of the first rotor magnetic pole 12 and the plurality of claws 13 of the second rotor magnetic pole 14 are inserted in respective space portions of other-party's rotor magnetic poles opposing to each other, and are alternately disposed to circumferentially interpose predetermined gaps. An outer circumferential face of the claws 11 of the first rotor magnetic pole 12 and an outer circumferential face of the claws 13 of the second rotor magnetic pole 14 constitute the outer circumferential face of the rotor 2.

The field winding 15 is attached in a space portion formed between the first rotor magnetic pole 12 and the second rotor magnetic pole 14 opposing to each other, namely in the space portion in an inner lateral side surrounded by the claws 11 of the first rotor magnetic pole 12 and the claws 13 of the second rotor magnetic pole 14. The field winding 15 is formed, as this will be described later, by winding a winding conductor in multiple layers around on an outer circumferential face of a bobbin. A pair of field-winding external conductors 16 connected to external conductor connection terminals of the field winding 15 is connected to a pair of respective slip rings 17 fixed on the rotor shaft 3.

A pair of brushes 18 is supported slidingly movable with each other in a brush holder 19 fixed on the bracket 7, and is pressed to the pair of slip rings 17 described above so as to make slidingly contact therewith due to spring pressure by compression springs 20. The pair of brushes 18 is connected to a DC voltage source (not shown in the figure) such as an automotive battery by way of lead conductors 21. In addition, on the bracket 7, there mounted are an electrical power conversion circuit 22 that is made of a plurality of semiconductor devices and performs the electrical power conversion between the armature winding 10 and the DC voltage source such as the automotive battery, a magnetic field control circuit 23 that controls the magnetic field current of the field winding 15, etc.

A pulley 24 fixed on one end of the rotor shaft 3 is joined to an output shaft of an internal-combustion engine (not shown in the figure) by means of a power transmitting member (not shown in the figure) such as a V-belt.

The automotive alternating-current generator 100 constituted as described above rotates when the rotor shaft 3 and the rotor 2 are driven by an internal-combustion engine by means of a power transmitting member such as a V-belt, and the pulley 24. At this time, the field winding 15 is energized from a DC voltage source such as a battery by means of the lead conductors 21, the brushes 18, the slip rings 17 and the field-winding external conductors 16, so that magnetic field flux is generated. The magnetic field flux flows in inner parts of the first rotor magnetic pole 12 and the second rotor magnetic pole 14 through gaps where the plurality of claws 11 of the first rotor magnetic pole 12 and the plurality of claws 13 of the second rotor magnetic pole 14 oppose to each other; accordingly, magnetic field flux passing through the aforementioned gaps crosses through the armature winding 10 according to the rotation of the rotor 2.

Because magnetic field flux passing through each of the gaps where the plurality of claws 11 of the first rotor magnetic pole 12 and the plurality of claws 13 of the second rotor magnetic pole 14 oppose to each other flows in alternately different directions for each of the gaps, an AC voltage is induced in the armature winding 10 that crosses through the magnetic field flux. The AC voltage induced in the armature winding 10, and an AC current that flows defined based on the AC voltage are converted into a DC voltage and a DC current by the electrical power conversion circuit 22, and supplied to an onboard battery, etc.

Figure 4:
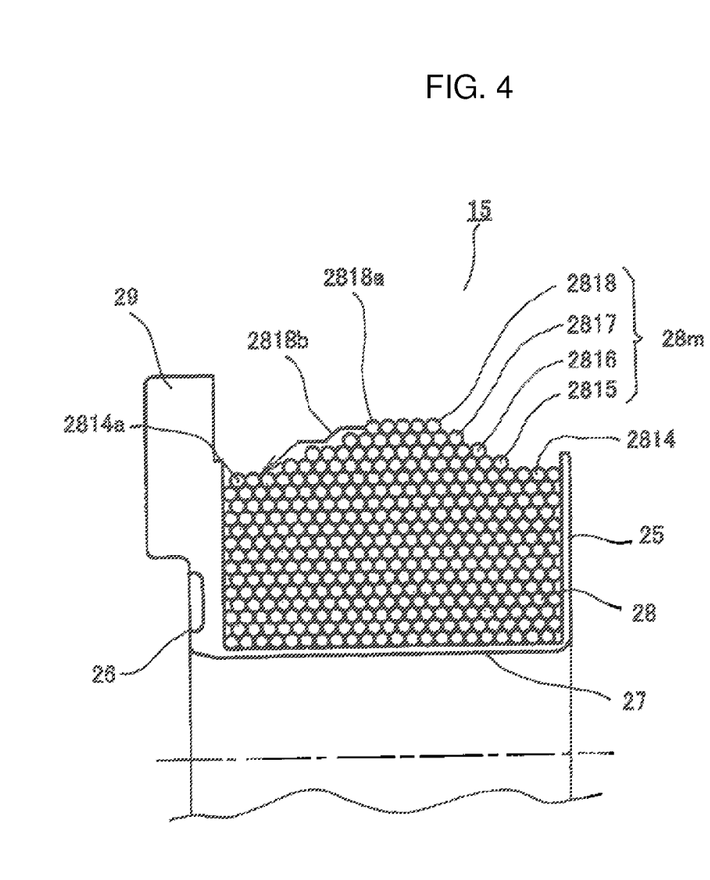
FIG. 4 is a cross-sectional view of part of a field winding of an automotive alternating-current generator which forms foundations for the present invention.
Figure 5:
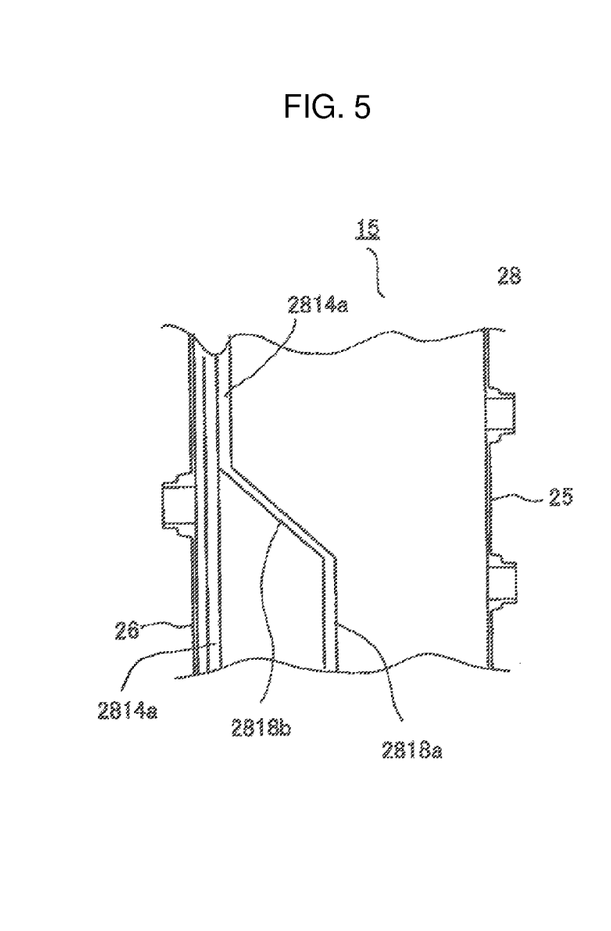
FIG. 5 is an illustrative diagram for explaining the field winding of the automotive alternating-current generator which forms foundations for the present invention.

Next, a structure of the field winding 15 and its winding method will be explained. FIG. 4 is a cross-sectional view of part of a field winding of an automotive alternating-current generator which forms foundations for the present invention, and FIG. 5 is an illustrative diagram for explaining the field winding of the automotive alternating-current generator which forms foundations for the present invention. In FIG. 4 and FIG. 5, the field winding 15 is formed in multiple layers by sequentially winding a winding conductor 28 around on an outer circumferential face of a cylindrical portion of a bobbin 27 made of a dielectric material having flange portions 25 and 26 each on both ends in an axial direction.

The field winding 15 shown in the figures is wound around in eighteen layers, as an example; each of the layers is wound around with an identical width in the axial direction from the lowest layer contacting the outer circumferential face of the bobbin 27 toward a 14th layer 2814 along the flange portions 25 and 26, whereas the layers are wound around so that the number of winding turns sequentially decreases toward a 15th layer 2815, a 16th layer 2816, a 17th layer 2817 and an 18th layer 2818 that is the uppermost layer. Therefore, in the field winding 15, an elevated winding portion 28*m* in which its cross-section takes the shape of mound in the axial direction is formed by the layers from the 15th layer 2815 toward the 18th layer 2818 that is the uppermost layer.

The reason why the elevated winding portion 28*m* is formed in an outer circumferential portion of the field winding 15 is attributed to that, by effectively utilizing space between undersides of the claws 11 of the first rotor magnetic pole 12 and undersides of the claws 13 of the second rotor magnetic pole 14, the number of turns of the field winding is increased. Namely, inner wall portions of the claws 11 of the first rotor magnetic pole 12 and inner wall portions of the claws 13 of the second rotor magnetic pole 14 described above are inclined toward tip portions of each of the claws to a side of outer circumferential face of the rotor, and wall thickness of the tip portions of respective claws 11 and 13 are formed to become thinner; as a result, because a space portion formed by inner wall portions of the claws 11 and inner wall portions of the claws 13 is formed to give a cross-section taking the shape of mound, the elevated winding portion 28*m* is formed to occupy the space portion so that the number of turns of the field winding 15 is increased.

In the case of the field winding 15 which forms foundations for the present invention, a winding conductor's end-portion 2818*a* residing in the 18th layer 2818 that is a top portion of the elevated winding portion 28*m* descends, as shown in FIG. 5, in one movement from the 18th layer 2818 to the 14th layer 2814 that is a skirting portion using one descending conductor portion 2818*b* formed by bending it toward an outer lateral side in the axial direction of the field winding 15 at a predetermined angle.

The descending conductor portion 2818*b* having descended to the 14th layer 2814 is wound for more than or equal to one turn in the 14th layer 2814 as a connection conductor portion 2814*a*, and thereafter connected to the field-winding external conductor 16 by way of an external conductor connection terminal.

As described above, the descending conductor portion 2818*b* descends, as shown in FIG. 5, from the 18th layer 2818 that is the top portion of the elevated winding portion 28*m*, passing diagonally across the 17th layer 2817, the 16th layer 2816 and the 15th layer 2815 in one movement, to the 14th layer 2814 that is the skirting portion. Namely, because a position of the winding conductor's end-portion 2818*a* is placed at a central portion in the axial direction of the field winding 15, it is necessary to provide a process to finish the winding by steeply descending it using the descending conductor portion 2818*b*, as shown in FIG. 5.

Nevertheless, when the finish of winding is performed by steeply descending diagonally across the elevated winding portion 28*m* using the descending conductor portion 2818*b*, the descending conductor portion 2818*b* descends by jumping over the three layers of 17th layer 2817, 16th layer 2816 and 15th layer 2815 by such movement as shown by the arrow in FIG. 4, thereby there exist problems in that sufficient adhesion to outer circumferential faces each of the 17th layer 2817, 16th layer 2816 and 15th layer 2815 is not achieved, and disengagement and winding disintegration are likely to be caused thus easily in part of the winding conductor after ceasing the winding around.

A field winding of an automotive alternating-current generator according to Embodiment 1 of the present invention described below can solve the aforementioned problems in the field winding of the automotive alternating-current generator which forms foundations for the present invention.

Embodiment 1

Figure 2:
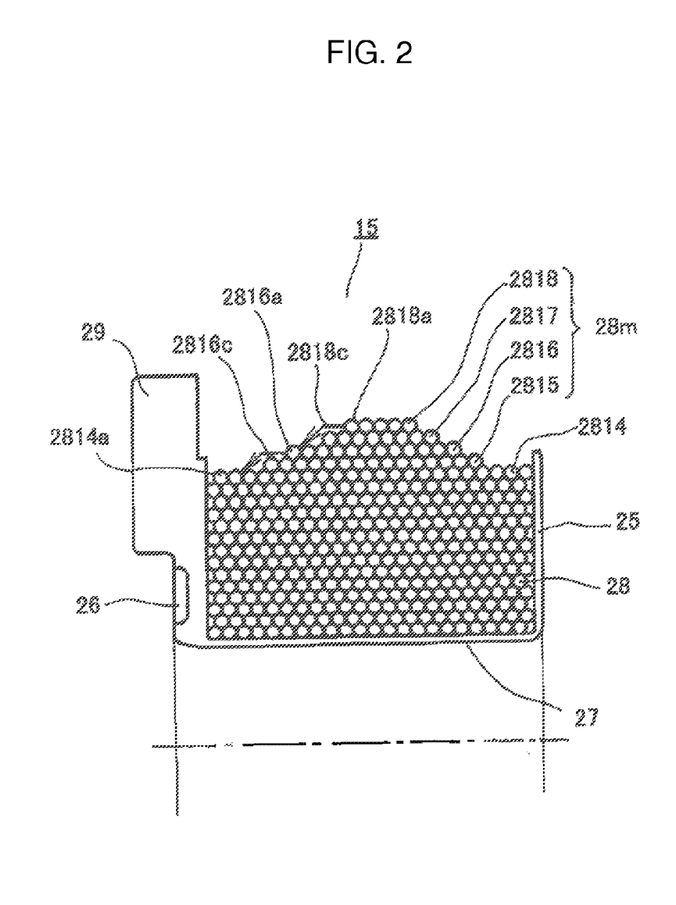
FIG. 2 is a cross-sectional view of part of a field winding of an automotive alternating-current generator according to Embodiment 1 of the present invention.
Figure 3:
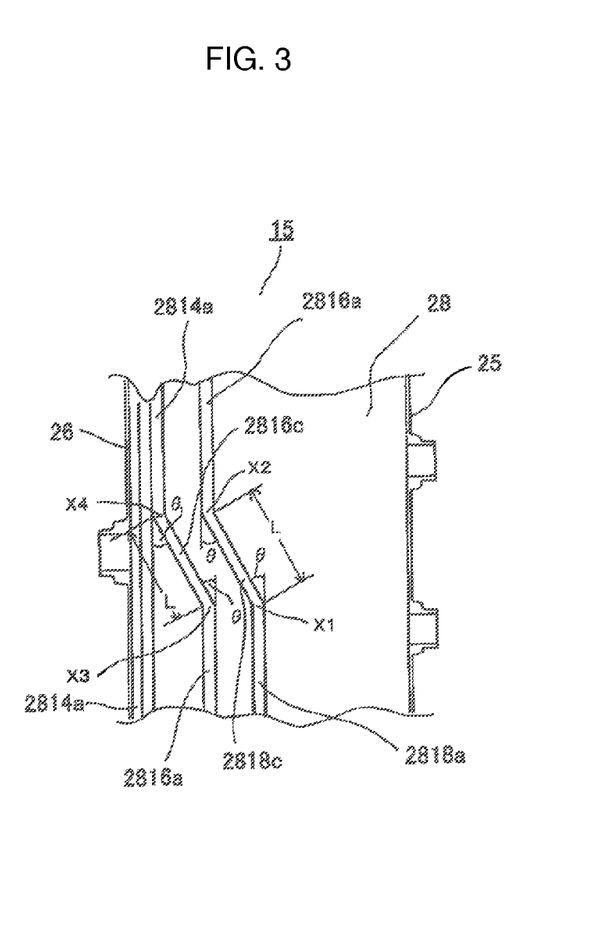
FIG. 3 is an illustrative diagram for explaining the field winding of the automotive alternating-current generator according to Embodiment 1 of the present invention.

FIG. 2 is a cross-sectional view of part of a field winding of an automotive alternating-current generator according to Embodiment 1 of the present invention, and FIG. 3 is an illustrative diagram for explaining the field winding of the automotive alternating-current generator according to Embodiment 1 of the present invention; the same reference numerals and symbols designate the same items corresponding to those in FIG. 4 and FIG. 5 described above.

In FIG. 2 and FIG. 3, the winding conductor's end-portion 2818*a* in the field winding 15 is connected to a field-winding external conductor by way of a first descending conductor portion 2818*c*, a first connection conductor portion 2816*a*, a second descending conductor portion 2816*c*, and a second connection conductor portion 2814*a*. The winding conductor constituting the field winding 15, and the end-portion 2818*a* of the conductor, the first descending conductor portion 2818*c*, the first connection conductor portion 2816*a*, the second descending conductor portion 2816*c*, and the second connection conductor portion 2814*a* are made of the identical winding conductor.

The first descending conductor portion 2818*c* is bent at a first bend position X1 of the end-portion 2818*a* of the winding conductor placed at a top portion of the elevated winding portion 28*m* toward the outer lateral side in the axial direction of the winding 15 at a predetermined angle θ, and descends along a side face of the elevated winding portion 28*m*, from the top portion of the elevated winding portion 28*m* to the 16th layer 2816 that is a predetermined winding layer among a plurality of winding layers forming the elevated winding portion 28*m*.

The first connection conductor portion 2816*a* is bent at a second bend position X2 of the first descending conductor portion 2818*c* toward the inner lateral side in the axial direction of the winding 15 at a predetermined angle θ, and wound only for approximately one turn along the side face of the elevated winding portion in a direction to which the winding conductor constituting the winding 15 extends.

The second descending conductor portion 2816*c* is bent at a third bend position X3 of the first connection conductor portion 2816*a* toward the outer lateral side in the axial direction of the winding 15 at a predetermined angle θ, and descends along the side face of the elevated winding portion 28*m*, from the aforementioned 16th layer 2816 to the 14th layer 2814 that is another predetermined winding layer.

The second connection conductor portion 2814*a* is bent at a fourth bend position X4 of the second descending conductor portion 2816*c* toward the inner lateral side in the axial direction of the winding 15 at a predetermined angle θ, wound for more than or equal to one turn in a direction to which the winding conductor constituting the winding 15 extends, and connected to the field-winding external conductor 16 by way of an external conductor connection terminal of the field winding 15.

The first descending conductor portion 2818*c* and the second descending conductor portion 2816*c* are mutually arranged side by side interposing an interspace therebetween, as shown in FIG. 3.

By descending from the end-portion 2818*a* of the winding conductor at the top portion of the elevated winding portion 28*m* using the first descending conductor portion 2818*c* and the second descending conductor portion 2816*c* as described above, it becomes possible to easily connect the winding conductor's end-portion 2818a to the external conductor connection terminal.

In addition, by winding the first connection conductor portion 2816a for more than or equal to half a turn on the side face of the elevated winding portion 28m, adhesive effects of the first descending conductor portion 2818c and the second descending conductor portion 2816c to the winding 15 can be held stronger, so that winding disintegration and disengagement are difficult to be caused. Moreover, by winding the second connection conductor portion 2814a for more than or equal to half a turn, adhesive effects of the first descending conductor portion 2818c and the second descending conductor portion 2816c to the winding 15 can be held further stronger, so that winding disintegration and disengagement are difficult to be caused.

In Embodiment 1 described above, the plurality of winding layers forming the elevated winding portion 28m is formed so that the number of turns of the 18th layer 2818 placed at the uppermost layer is the smallest in Embodiment 1, and their numbers of turns are sequentially increased in accordance with a lower layer toward the 17th layer 2817, the 16th layer 2816 and the 15th layer 2815. Namely, they are configured in such a manner that the more a winding layer is placed at an upper layer, the less the number of its turns becomes than that of a winding layer placed at an lower layer.

The predetermined bend angle θ at the aforementioned first bend position X1, second bend position X2, third bend position X3 and fourth bend position X4 is the identical angle at them each, and is set in a range from 15 degrees to 30 degrees inclusive, for example. In addition, the lengths of the first descending conductor portion 2818c and the second descending conductor portion 2816c are formed in the identical dimension L. Here, each of the predetermined bend angles θ described above is set in a range from 15 degrees to 30 degrees inclusive, and each of the bend angles is set at the identical angle. Note that, these bend angles θ are not necessarily limited to being set at the identical angle, if they are in a range from 15 degrees to 30 degrees inclusive.

Note that, the first connection conductor portion 2816a is shown in a case in which it is wound around on a side face of the elevated winding portion 28m for approximately one turn only in Embodiment 1; not necessarily limited thereto, it may be adopted that any number of turns of wounding around is made for, if it is for more than or equal to half a turn. In addition, the second connection conductor portion 2814a is wound around for more than one turn in Embodiment 1; however, not necessarily limited thereto, it may be adopted that any number of turns of wounding around is made for, if it is for more than or equal to half a turn.

Moreover, although the elevated winding portion 28m is formed by overlapping the four layers from the 15th layer 2815 through the 18th layer 2818 in Embodiment 1, it is not necessarily limited to this; it is suitable that overlaps of at least three winding layers may be formed.

Note that, other structures are similar to those of the field winding and its winding method shown in aforementioned FIG. 4 and FIG. 5 for the automotive alternating-current generator which forms foundations for the present invention.

The automotive alternating-current generator according to Embodiment 1 of the present invention described above gives a concrete form to a winding, a method of the winding, and an automotive alternating-current generator according to the present invention. Namely, the automotive alternating-current generator according to Embodiment 1 of the present invention described above subsumes the following inventions.

(1) In a ring-shaped winding including, in an outer circumferential portion thereof, an elevated winding portion in which a cross-sectional shape thereof takes a shape of mound in an axial direction,
the winding is characterized to comprise
a first descending conductor portion being bent from an end-portion of a winding conductor placed at a top portion of the elevated winding portion toward an outer lateral side in the axial direction of the winding, and descending along a side face of the elevated winding portion, from the top portion thereof to a predetermined winding layer among a plurality of winding layers forming the elevated winding portion;
a first connection conductor portion bent from the first descending conductor portion toward an inner lateral side in the axial direction of the winding, and disposed along the side face of the elevated winding portion in a direction to which a winding conductor constituting the winding extends; and
a second descending conductor portion being bent from the first connection conductor portion toward the outer lateral side in the axial direction of the winding, and descending along the side face of the elevated winding portion, from the predetermined winding layer to another predetermined winding layer.

(2) In the winding, each bending angle is set, preferably, in a range from 15 degrees to 30 degrees inclusive.

(3) In the winding, each bending angle is set, preferably, at an identical angle.

(4) In the winding, the first connection conductor portion is wound, preferably, for more than or equal to half a turn on the side face of the elevated winding portion.

(5) In the winding, the second descending conductor portion is connected, preferably, to an external conductor connection terminal of the winding by way of a second connection conductor portion disposed along the winding conductor constituting the winding.

(6) In the winding, the second connection conductor portion is wound, preferably, for more than or equal to half a turn on an outer circumferential portion of the winding.

(8) In the winding, the winding conductor constituting the winding, the first descending conductor portion, the first connection conductor portion, the second descending conductor portion, the second connection conductor portion, and the external conductor connection portion are made, preferably, of an identical conductor continuously extending from the winding conductor.

(9) In the winding, the elevated winding portion is formed, preferably, by overlapping at least three winding layers.

(10) In the winding, the plurality of winding layers forming the elevated winding portion is formed, preferably, in such a manner that the number of turns of a winding layer placed at an upper layer is less than that of a winding layer placed at an lower layer.

(11) In the winding, the first descending conductor portion and the second descending conductor portion are mutually arranged, preferably, side by side interposing an interspace therebetween.

(12) In a method of winding a ring-shaped winding including, in an outer circumferential portion thereof, an elevated winding portion in which a cross-sectional shape thereof takes a shape of mound in an axial direction, the winding method is characterized in that an end-portion of a winding conductor in a top portion of the elevated winding portion descends along a side face of the elevated winding portion, by way of at least two descending conductor portions bent toward an outer lateral side in the axial direction of the winding.

(13) In the winding method, preferably, a connection conductor portion mutually connecting between the descending conductor portions is wound for more than or equal to half a turn along the side face of the elevated winding portion.

(14) In the winding method, preferably, the at least two descending conductor portions each are bent, with respect to a direction to which the winding conductor constituting the winding extends, toward the outer lateral side in the axial direction of the winding in a range from 15 degrees to 30 degrees inclusive.

(15) In an automotive rotating electric machine driven by an internal-combustion engine mounted on a motor vehicle, the automotive rotating electric machine is characterized in that the winding as set forth in any one of (1) to (11) is mounted on a rotor as a field winding thereof.

(16) In the automotive rotating electric machine, preferably, the rotor comprises a first rotor magnetic pole including a plurality of claws extending in an axial direction of the rotor, and a second rotor magnetic pole being disposed to oppose the first rotor magnetic pole, and including a plurality of claws each opposing to the plurality of claws of the first rotor magnetic pole through predetermined gaps; and the field winding is attached in a space portion surrounded by the plurality of claws of the first rotor magnetic pole and the plurality of claws of the second rotor magnetic pole.

(17) In the automotive rotating electric machine, preferably, inner wall portions of the plurality of claws of the first rotor magnetic pole and inner wall portions of the plurality of claws of the second rotor magnetic pole are formed to incline to a side of outer circumferential face of the rotor, toward tip portions of each of the claws, and an elevated winding portion of the field winding is disposed corresponding to a space portion formed by the inclined inner wall portions of the claws.

INDUSTRIAL APPLICABILITY

The present invention can be utilized, for example, in a field of automotive vehicle industries, and particularly in the field of a rotating electric machine mounted on an automotive vehicle.

EXPLANATION OF NUMERALS AND SYMBOLS

Numeral "100" designates an automotive alternating-current generator; "1," stator; "2," rotor; "3," rotor shaft; "4," "5," bracket; "8," stator slot; "9," stator core; "10," stator winding (armature winding); "11," "13," claw; "12," first rotor magnetic pole; "14," second rotor magnetic pole; "15," field winding; "16," field-winding external conductor; "17," slip ring; "18," brush; "19," brush holder; "20," compression spring; "21," lead conductor; "22," electrical power conversion circuit; "23," magnetic field control circuit; "24," pulley; "24," power transmitting member; "28m," elevated winding portion; "2814," 14th layer; "2815," 15th layer; "2816," 16th layer; "2817," 17th layer; "2818," 18th layer; "2818a," end-portion of winding conductor; "2818b," descending conductor portion; "2818c," first descending conductor portion; "2816a," first connection conductor portion; "2816c," second descending conductor portion; "2814a," second connection conductor portion; "X1," first bend position; "X2," second bend position; "X3," third bend position; and "X4," fourth bend position.

What is claimed is:

1. A ring-shaped winding including, in an outer circumferential portion thereof, an elevated winding portion in which a cross-sectional shape thereof takes a shape of mound in an axial direction, the winding, comprising:
   a first descending conductor portion being bent from an end-portion of a winding conductor placed at a top portion of the elevated winding portion toward an outer lateral side in the axial direction of the winding, and descending along a side face of the elevated winding portion, from the top portion thereof to a predetermined winding layer among a plurality of winding layers forming the elevated winding portion;
   a first connection conductor portion bent from the first descending conductor portion toward an inner lateral side in the axial direction of the winding, and disposed along the side face of the elevated winding portion in a direction to which a winding conductor constituting the winding extends; and
   a second descending conductor portion being bent from the first connection conductor portion toward the outer lateral side in the axial direction of the winding, and descending along the side face of the elevated winding portion, from the predetermined winding layer to another predetermined winding layer.

2. The winding as set forth in claim 1, wherein each bending angle is set in a range from 15 degrees to 30 degrees inclusive.

3. The winding as set forth in claim 1, wherein each bending angle is set at an identical angle.

4. The winding as set forth in claim 1, wherein the first connection conductor portion is wound for more than or equal to half a turn on the side face of the elevated winding portion.

5. The winding as set forth in claim 1, wherein the second descending conductor portion is connected to an external conductor connection terminal of the winding by way of a second connection conductor portion disposed along the winding conductor constituting the winding.

6. The winding as set forth in claim 5, wherein the second connection conductor portion is wound for more than or equal to half a turn on an outer circumferential portion of the winding.

7. The winding as set forth in claim 5, wherein the winding conductor constituting the winding, the first descending conductor portion, the first connection conductor portion, the second descending conductor portion, the second connection conductor portion, and the external conductor connection portion are made of an identical conductor continuously extending from the winding conductor.

8. The winding as set forth in claim 1, wherein the elevated winding portion is formed by overlapping at least three winding layers.

9. The winding as set forth in claim 1, wherein the plurality of winding layers forming the elevated winding portion is formed in such a manner that the number of turns of a winding layer placed at an upper layer is less than that of a winding layer placed at an lower layer.

10. The winding as set forth in claim 1, wherein the first descending conductor portion and the second descending conductor portion are mutually arranged side by side interposing an interspace therebetween.

11. A method of winding a ring-shaped winding including, in an outer circumferential portion thereof, an elevated winding portion in which a cross-sectional shape thereof takes a shape of mound in an axial direction; the method of winding characterized in that an end-portion of a winding conductor in a top portion of the elevated winding portion descends along a side face of the elevated winding portion, by way of at least two descending conductor portions bent toward an outer lateral side in the axial direction of the winding, wherein the at least two descending conductor portions are each separated by a connection conductor portion.

12. The method of winding the winding as set forth in claim 11, wherein the connection conductor portion mutually connecting between the descending conductor portions is wound for more than or equal to half a turn along the side face of the elevated winding portion.

13. The method of winding the winding as set forth in claim 11, wherein the at least two descending conductor portions each are bent, with respect to a direction to which the winding conductor constituting the winding extends, toward the outer lateral side in the axial direction of the winding in a range from 15 degrees to 30 degrees inclusive.

14. An automotive rotating electric machine driven by an internal-combustion engine mounted on a motor vehicle, the automotive rotating electric machine characterized in that the winding as set forth in claim 1 is mounted on a rotor as a field winding thereof.

15. The automotive rotating electric machine as set forth in claim 14, wherein the rotor comprises a first rotor magnetic pole including a plurality of claws extending in an axial direction of the rotor, and a second rotor magnetic pole being disposed to oppose the first rotor magnetic pole, and including a plurality of claws each opposing to the plurality of claws of the first rotor magnetic pole through predetermined gaps; and wherein the field winding is attached in a space portion surrounded by the plurality of claws of the first rotor magnetic pole and the plurality of claws of the second rotor magnetic pole.

16. The automotive rotating electric machine as set forth in claim 14, wherein inner wall portions of the plurality of claws of the first rotor magnetic pole and inner wall portions of the plurality of claws of the second rotor magnetic pole are formed to incline to a side of outer circumferential face of the rotor, toward tip portions of each of the claws, and an elevated winding portion of the field winding is disposed corresponding to a space portion formed by the inclined inner wall portions of the claws.

17. The winding as set forth in claim 1, wherein the first descending portion descends across two winding layers.

18. The method of winding the winding as set forth in claim 11, wherein at least one of the at least two descending conductor portions descends across two winding layers.

* * * * *